(12) United States Patent
Baek et al.

(10) Patent No.: US 8,743,318 B2
(45) Date of Patent: Jun. 3, 2014

(54) DISPLAY DEVICE AND METHOD OF MANUFACTURING THE SAME

(75) Inventors: Jong-In Baek, Yongin (KR); Won-Sang Park, Yongin (KR); Jae-Hyun Kim, Yongin (KR); Jae-Ik Lim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 211 days.

(21) Appl. No.: 13/219,964

(22) Filed: Aug. 29, 2011

(65) Prior Publication Data

US 2012/0307189 A1    Dec. 6, 2012

(30) Foreign Application Priority Data

Jun. 1, 2011   (KR) .......................... 10-2011-0052852

(51) Int. Cl.
*G02F 1/1333* (2006.01)

(52) U.S. Cl.
USPC ................... 349/92; 349/86; 349/88; 349/89; 349/90; 349/91; 349/93; 349/94

(58) Field of Classification Search
USPC .......................................... 349/86, 88, 89–94
See application file for complete search history.

(56) References Cited

U.S. PATENT DOCUMENTS

2002/0130988 A1*   9/2002   Crawford et al. ............... 349/86

FOREIGN PATENT DOCUMENTS

| KR | 10-2004-0013787 | 2/2004 |
| KR | 10-0805792 | 2/2008 |
| KR | 10-2008-0062852 | 7/2008 |
| KR | 10-2009-0120772 | 11/2009 |

* cited by examiner

*Primary Examiner* — Phu Vu
(74) *Attorney, Agent, or Firm* — Robert E. Bushnell, Esq.

(57) ABSTRACT

A display device may be constructed with a first substrate having a first electrode and a second electrode, a second substrate formed on the first substrate and facing the first substrate, and a liquid crystal layer interposed between the first substrate and the second substrate. The liquid crystal layer may be constructed with a polymer-stabilized liquid crystal (PSLC), and a size of domains of the PSLC is 200 nm or less.

26 Claims, 9 Drawing Sheets

DISPLAY DEVICE AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on the 1 Jun. 2011 and there duly assigned Serial No. 10-2011-0052852.

BACKGROUND OF THE INVENTION

1. Field of the Invention

The present invention relates to a display device and a method of manufacturing the same, and more particularly, to a display device using a polymer-stabilized liquid crystal display (LCD) and a method of manufacturing the display device.

2. Description of the Related Art

The rapid development of the information technology (IT) industry is dramatically increasing the use of display devices. Recently, there have been demands for display devices which are lightweight and thin, consume low power, and provide high resolution. To meet these demands, liquid crystal displays (LCDs) are being developed.

Modes of LCDs include a twisted nematic (TN) mode, a vertical alignment (VA) mode, an in-plane switching (IPS) mode, and a fringe field switching (FFS) mode.

TN mode LCDs, even in a dark state, experience leakage of light at the sides thereof due to optical anisotropy of liquid crystals. Thus, they need an optical film to compensate a viewing angle. In VA mode LCDs, liquid crystals are vertically aligned to secure a high front contrast ratio. However, viewing angle compensation is required to realize a wide viewing angle by suppressing the leakage of light at the sides. In the case of IPS or FFS mode LCDs, a dark state is realized by horizontally aligning liquid crystals such that an axis of the liquid crystals matches a polarizing plate. Therefore, IPS or FFS mode LCDs have a better dark state at the sides than LCDs of other modes. However, a bluish dark state is shown at the sides due to a pretilt angle of liquid crystals. To solve this problem, optical compensation is needed.

When impact is applied on a panel of a conventional LCD, liquid crystals may flow, causing pooling. In addition, when an impact point is moved, bruising may occur. With the recent introduction of touch panel technology to displays, pooling and bruising are recognized as main causes of a reduction in display quality of the displays. Furthermore, to manufacture a conventional LCD, a thin-film transistor (TFT) substrate and a color filter (CF) substrate are manufactured separately, and liquid crystals are injected or dropped between the TFT substrate and the CF substrate. This manufacturing process requires a lot of time.

SUMMARY OF THE INVENTION

Aspects of the present invention provide a display device which exhibits superior front contrast ratio and superior lateral visibility by realizing an optically isotropic state in a polymer-stabilized liquid crystal (PSLC), which does not suffer from pooling or bruising caused by external pressure, and which can be manufactured in a simplified process, and a method of manufacturing the display device.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided a display device which may include a first substrate having a first electrode and a second electrode, a second substrate formed on the first substrate so as to face the first substrate, and a liquid crystal layer interposed between the first substrate and the second substrate, wherein the liquid crystal layer may include a polymer-stabilized liquid crystal (PSLC), and a size of domains of the PSLC is 200 nm or less.

According to an aspect of the present invention, there is provided a method of manufacturing a display device. The method may include preparing a first substrate and a second substrate, preparing a liquid crystal film comprising a PSLC, placing the liquid crystal film on the first substrate, and placing the second substrate on the liquid crystal film.

According to another aspect of the present invention, there is provided a method of manufacturing a display device. The method may include preparing a first substrate and a second substrate, coating a mixture of liquid crystals and a monomer on the first substrate, forming a PSLC to have a domain size of 200 nm or less by exposing the mixture to ultraviolet light, and placing the second substrate on the PSLC

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as being limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that, when a layer is referred to as being "on" another layer or substrate, it can be directly on the other layer or substrate, or intervening layers may also be present. In contrast, when an element is referred to as being "directly on" another element, there are no intervening elements present.

Figure 1:
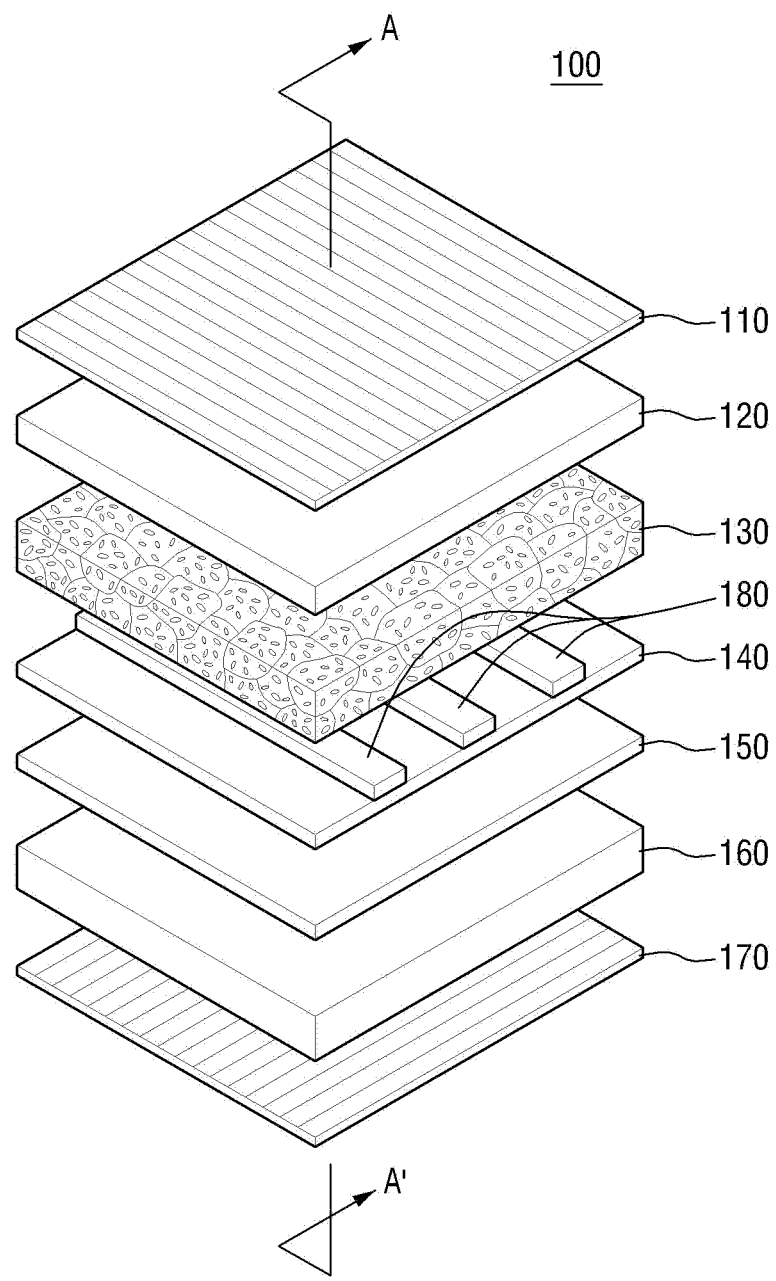
FIG. 1 is an exploded perspective view of a display device according to an exemplary embodiment of the present invention.
Figure 2:
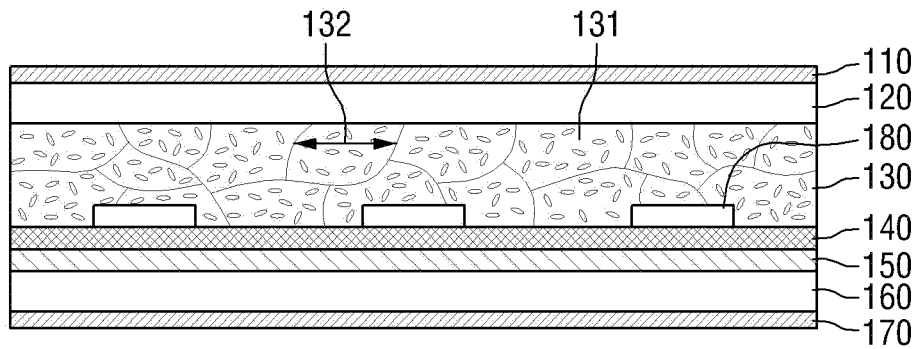
FIG. 2 is a cross-sectional view of the display device shown in FIG. 1, in which no electric field has been applied to a first electrode and a second electrode.
Figure 3:
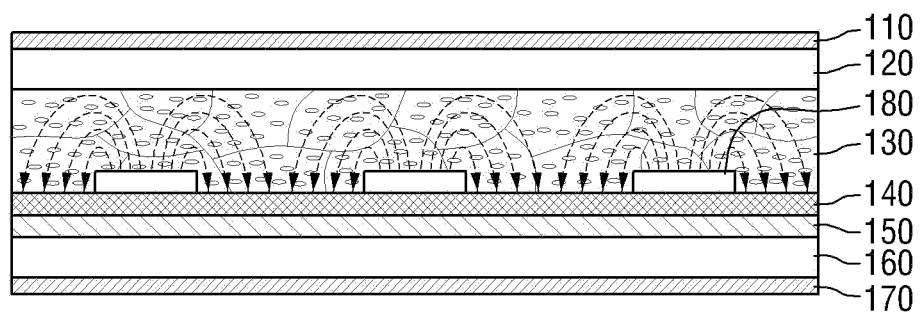
FIG. 3 is a cross-sectional view of the display device shown in FIG. 1, in which an electric field has been applied to the first electrode and the second electrode.
Figure 4:
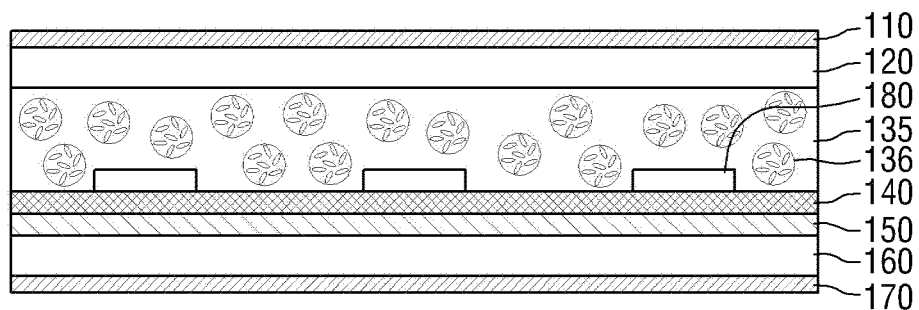
FIG. 4 is a cross-sectional view of the display device shown in FIG. 1, in which no electric field has been applied to the first electrode and the second electrode.
Figure 5:
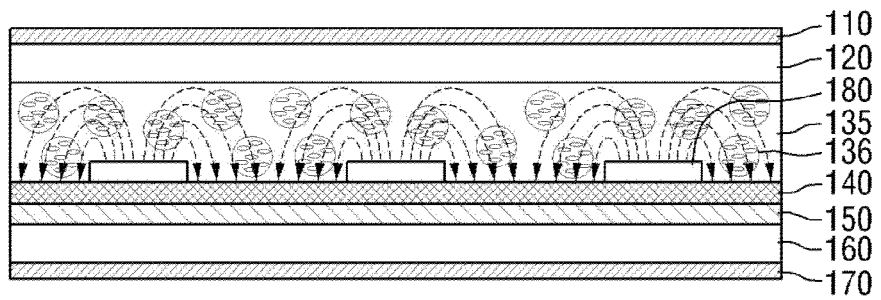
FIG. 5 is a cross-sectional view of the display device shown in FIG. 1, in which an electric field has been applied to the first electrode and the second electrode.
Figure 6:
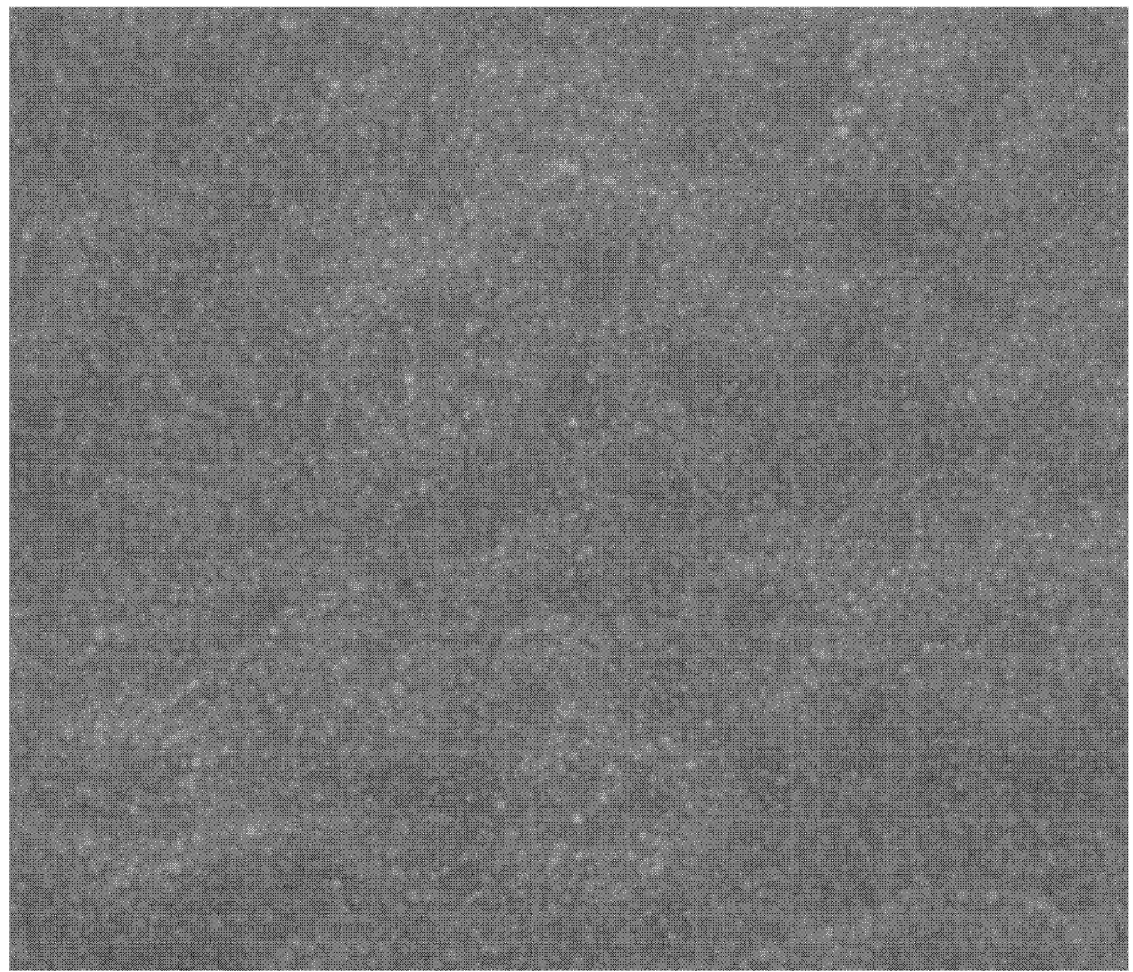
FIG. 6 shows an image of a polymer-dispersed liquid crystal (PDLC) according to an exemplary embodiment of the present invention.
Figure 7:
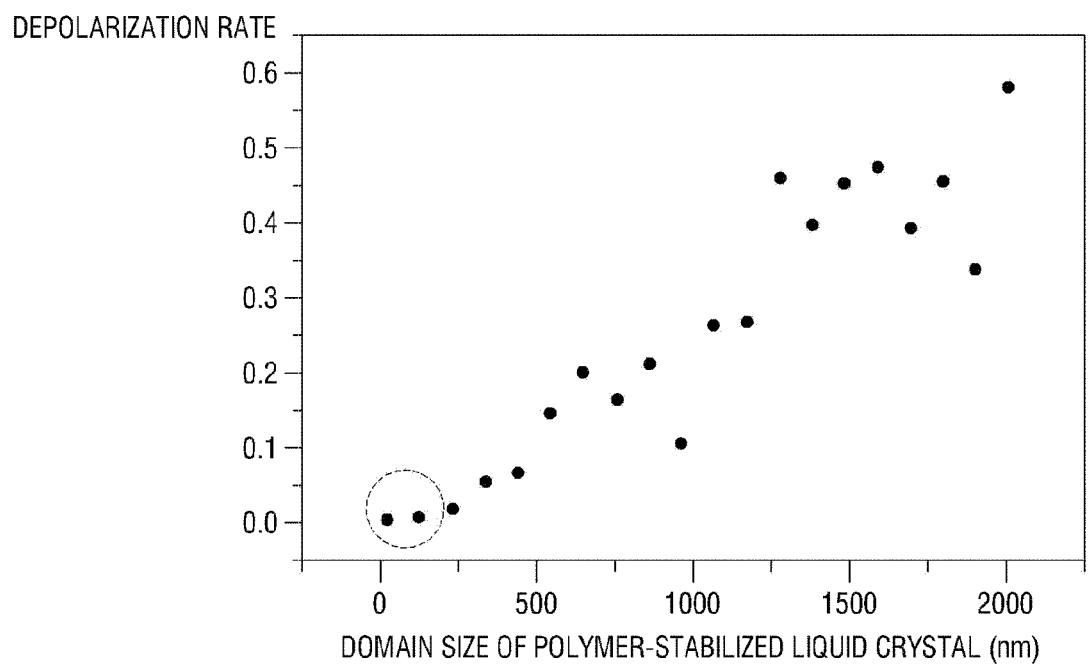
FIG. 7 is a graph of the domain size of a polymer-stabilized liquid crystal (PSLC) versus depolarization rate.

FIG. 1 is an exploded perspective view of a display device 100 according to an exemplary embodiment of the present invention; FIGS. 2 and 3 are cross-sectional views of the display device shown in FIG. 1; FIGS. 4 and 5 are cross-sectional views of the display device shown in FIG. 1; FIG. 6 shows an image of a polymer-dispersed liquid crystal (PDLC) according to an exemplary embodiment of the present invention; and FIG. 7 is a graph of the domain size of a polymer-stabilized liquid crystal (PSLC) versus depolarization rate.

Referring to FIGS. 1 thru 7, the display device 100 according to the current exemplary embodiment includes a first substrate 160 on which a first electrode 180 and a second electrode 150 are formed, a second substrate 120 which is disposed on the first substrate 160 so as to face the first substrate 160, and a liquid crystal layer 130 (FIGS. 1 thru 3) or 135 (FIGS. 4 and 5) which is interposed between the first substrate 160 and the second substrate 120.

The first substrate 160 is located in a lower part of the display device 100. The first substrate 160 may be a thin-film transistor (TFT) substrate. When formed as a TFT substrate, the first substrate 160 may include TFTs and TFT driving circuits. In some embodiments, the first substrate 160 may be made of glass.

The second substrate 120 faces the first substrate 160 and is located in an upper part of the display device 100. The second substrate 120 may be a color filter substrate. When formed as a color filter substrate, the second substrate 120 may include a black matrix as well as color filters. In some embodiments, the second substrate 120 may be made of glass.

The display device 100 may further include a first polarizing plate 110 and a second polarizing plate 170. The first polarizing plate 110 may be disposed on an upper surface of the second substrate 120, and the second polarizing plate 170 may be disposed on a lower surface of the first substrate 160. A polarization direction of the first polarizing plate 110 may be parallel or perpendicular to a polarization direction of the second polarizing plate 170. In the display device 100 to be described below, the polarization directions of the first and second polarizing plates 110 and 170, respectively, are perpendicular to each other.

The liquid crystal layer 130 or 135 may be interposed between the first substrate 160 and the second substrate 120. The liquid crystal layer 130 (FIGS. 1 thru 3) or 135 (FIGS. 4 and 5) may include a PSLC. The PSLC consists of a mixture of liquid crystals and a polymer. The polymer forms domains 131 (FIG. 2) or 136 (FIG. 4) in the PSLC, and liquid crystals are dispersed within each of the domains 131 or 136 formed of the polymer.

In FIG. 2, an embodiment in which the PSLC included in the liquid crystal layer 130 is a polymer-networked liquid crystal (PNLC) is illustrated. Referring to FIG. 2, the PNLC is a type of PSLC. A polymer included in the PNLC may be formed as a net-shaped structure so as to create a plurality of networks. The networks of the PNLC have the same meaning as the domains 131 of the PSLC. The networks of the PNLC may denote spaces created by the polymer formed as the net-shaped structure in the PNLC.

Liquid crystals are dispersed within each network of the PNLC. Referring to FIG. 2, no electric field has been applied to the first electrode 180 and the second electrode 150. Accordingly, liquid crystals are not arranged in a certain direction but are dispersed in random directions.

In the display device 100 according to the current exemplary embodiment, the size of the domains 131 of the PSLC is 200 nm or less. In some embodiments, the size of the domains 131 of the PSLC may be 80 nm or less. The size of the domains 131 of the PSLC may denote a distance 132 between the networks of the PNLC, and the distance 132 between the networks of the PNLC may denote a distance in a long direction, among distances between one network and another network. When the PSLC is a PNLC as in the case of FIG. 2, the distance 132 between the networks of the PNLC may be 200 nm or less. Furthermore, the distance 132 between the networks of the PNLC may be 80 nm or less.

FIG. 7 is a graph of the size of the domains 131 or 136 of the PSLC versus depolarization rate. Referring to FIG. 7, as the size of the domains 131 or 136 of the PSLC decreases, the depolarization rate also decreases. When the size of the domains 131 or 136 of the PSLC is 200 nm or less, the depolarization rate is nearly zero. Since the depolarization rate and the contrast ratio are inversely proportional to each other, a reduction in the depolarization rate ensures a superior contrast ratio. In particular, when the size of the domains 131 or 136 of the PSLC is 200 nm or less, a more superior contrast ratio can be achieved.

When the size of the domains 131 of the PSLC (that is, when the distance 132 between the networks of the PNLC) is much smaller than wavelengths (approximately 380 to 770 nm) of visible light, a scattering effect in the PNLC disappears. In addition, when the distance 132 between the networks of the PNLC is very small, the refraction of light in the PNLC is substantially very small. Therefore, an optically isotropic state can be realized in a visible light range.

An index ratio of the PSLC is a value obtained by dividing the difference between an index of a polymer and an index of domains by the index of the domain. A smaller index ratio denotes a smaller difference in refractive index between the polymer and liquid crystals in the domains. When the size of the domains is 200 nm or less as in the current exemplary embodiment, the index ratio has a very small value of approximately 0.03. Accordingly, the refraction of light which passes through the polymer and the liquid crystals is substantially very small, resulting in an optically isotropic state in the visible light range.

In FIG. 2, no electric field has been applied to the display device 100. Since the polarization direction of the first polarizing plate 110 disposed on the upper surface of the second substrate 120 is perpendicular to the polarization direction of the second polarizing plate 170 disposed on the lower surface of the first substrate 160, a dark state (that is, black) can be realized.

FIG. 3 is a cross-sectional view of the display device 100 in which an electric field has been applied to the first electrode 180 and the second electrode 150. Liquid crystals of the display device 100 may be positive (P-type) liquid crystals. When the liquid crystals of the display device 100 are the P-type liquid crystals, if a horizontal electric field is applied to the first electrode 180 and the second electrode 150 as shown in FIG. 3, the liquid crystals are arranged in the direction of the electric field. In some embodiments, the liquid crystals of the display device 100 may be negative (N-type) liquid crystals. When the N-type liquid crystals are used, the display device 100 is driven in the same way as when the P-type liquid crystals are used, except that the N-type liquid crystals are arranged in a direction perpendicular to the electric field.

When a horizontal electric field is applied as shown in FIG. 3, the liquid crystals are arranged in the direction of the electric field, causing a phase delay in the liquid crystal layer 130. In the display device 100 according to the current exemplary embodiment, the polarization direction of the first polarizing plate 110 disposed on the upper surface of the second substrate 120 is perpendicular to the polarization direction of the second polarizing plate 170 disposed on the lower surface of the first substrate 160. Therefore, the applied horizontal electric field may induce a bright state, that is, white.

When the liquid crystal display device 100 according to the current exemplary embodiment is in a dark state, the arrangement of liquid crystals is optically isotropic, leading to a superior front contrast ratio. In addition, since the arrangement of liquid crystals is optically isotropic in the dark state, a very dark state can also be realized at the sides of the display device 100. This can ensure a wide viewing angle.

Furthermore, the polymer in the PNLC forms a net-shaped structure, and liquid crystals are dispersed in each space formed by the polymer. Therefore, the flow of the liquid crystals caused by external pressure can be limited as compared with a conventional liquid crystal display device. Consequently, the problem of pooling or bruising can be solved.

In FIG. 4, an embodiment in which the PSLC included in the liquid crystal layer 135 is a PDLC is illustrated. The PDLC is a type of PSLC, and a polymer included in the PDLC may be formed as a structure including droplets. In FIG. 4, spherical droplets are illustrated for ease of description. However, the droplets can also be formed as spaces of other shapes. The droplets of the PDLC have the same meaning as the domains 136 of the PSLC. FIG. 6 is a scanning electron microscope (SEM) photograph of the PDLC. It can be seen from FIG. 6 that a plurality of droplets, each including liquid crystals, are distributed in the polymer.

Liquid crystals are dispersed within each droplet of the PDLC. Referring to FIG. 4, no electric field has been applied to the first electrode 180 and the second electrode 150 of the first substrate 160. Accordingly, liquid crystals are not arranged in a certain direction but are dispersed in random directions.

In the display device 100 according to the current exemplary embodiment, the size of the domains 136 of the PSLC is 200 nm or less. Preferably, the size of the domains 136 of the PSLC may be 80 nm or less. The size of the domains 136 of the PSLC may be a diameter of the droplets of the PDLC in a long direction. When the PSLC is a PDLC as shown in FIG. 4, the diameter of the droplets of the PDLC in the long direction may be 200 nm or less. Preferably, the diameter of the droplets of the PDLC in the long direction may be 80 nm or less.

When the size of the domains 136 of the PSLC (that is, when the diameter of the droplets of the PDLC in the long direction) is much smaller than wavelengths (approximately 380 to 770 nm) of visible light, a scattering effect in the PDLC disappears. In addition, when the diameter of the droplets of the PDLC in the long direction is very small, the refraction of light in the PDLC is substantially very small. Therefore, an optically isotropic state can be realized in a visible light range.

In FIG. 4, no electric field has been applied to the display device 100. Since the polarization direction of the first polarizing plate 110 disposed on the upper surface of the second substrate 120 is perpendicular to the polarization direction of the second polarizing plate 170 disposed on the lower surface of the first substrate 160, a dark state (that is, black) can be realized.

FIG. 5 is a cross-sectional view of the display device 100 in which an electric field has been applied to the first electrode 180 and the second electrode 150. Liquid crystals of the display device 100 may be positive (P-type) liquid crystals. When the liquid crystals of the display device 100 are the P-type liquid crystals, if a horizontal electric field is applied to the first electrode 180 and the second electrode 150 as shown in FIG. 5, the liquid crystals are arranged in the direction of the electric field. In some embodiments, the liquid crystals of the display device 100 may be negative (N-type) liquid crystals. When the N-type liquid crystals are used, the display device 100 is driven in the same way as when the P-type liquid crystals are used, except that the N-type liquid crystals are arranged in a direction perpendicular to the electric field.

When a horizontal electric field is applied as shown in FIG. 5, the liquid crystals are arranged in the direction of the electric field, causing a phase delay in the liquid crystal layer 135. In the display device 100, the polarization direction of the first polarizing plate 110 disposed on the upper surface of the second substrate 120 is perpendicular to the polarization direction of the second polarizing plate 170 disposed on the lower surface of the first substrate 160. Therefore, the applied horizontal electric field may induce a bright state (that is, white).

When the display device 100 according to the current exemplary embodiment is in a dark state, the arrangement of liquid crystals is optically isotropic, leading to a superior front contrast ratio. In addition, since the arrangement of liquid crystals is optically isotropic in the dark state, a very dark state can also be realized at the sides of the display device 100. This can ensure a wide viewing angle.

Furthermore, the polymer in the PNLC forms a net-shaped structure, and liquid crystals are dispersed in each space formed by the polymer. Therefore, the flow of the liquid crystals caused by external pressure can be limited as compared with a conventional liquid crystal display device. Consequently, the problem of pooling or bruising can be solved.

While the PNLC and the PDLC have been described above as embodiments of the PSLC, the present invention is not limited thereto. Liquid crystal stabilized polymer (LCSP), polymer stabilized ferroelectric liquid crystal (PSFLC), and the like are also applicable as embodiments of the PSLC according to the present invention.

Referring to FIGS. 1 thru 5, the first electrode 180 and the second electrode 150 are formed on the first substrate 160. In some embodiments, the first electrode 180 and the second electrode 150 may be formed on a surface of the first substrate 160.

The first electrode 180 is located in a lower part of each pixel and may be a pixel electrode which applies an electric field to the liquid crystal layer 130 or 135. The first electrode 180 may be a transparent electrode made of ITO.

The second electrode 150 is common to all pixels. The second electrode 150 may be a common electrode which enables the formation of an electric field in the liquid crystal layer 130 or 135 when a signal is transmitted to a pixel electrode. The second electrode 150 may be a transparent electrode made of ITO.

Further referring to FIGS. 1 thru 5, the first electrode 180 and the second electrode 150 may be formed on different layers on the first substrate 160. In this case, the second electrode 150 which is the common electrode may be disposed on the first substrate 160, an insulating layer 140 may be disposed on the second electrode 150 so as to insulate the second electrode 150 from the first electrode 180, and the first electrode 180 which is the pixel electrode may be disposed on the insulating layer 140. As described above, liquid crystals in the liquid crystal layer 130 or 135 may be controlled by an electric field applied between the first electrode 180 and the second electrode 150.

The first electrode 180 and the second electrode 150 may also be formed on the same layer, that is, on the first substrate 160. In this case, the first electrode 180 (i.e., the pixel electrode) and the second electrode 150 (i.e., the common electrode) may be arranged alternately on the first substrate 160.

Figure 8:
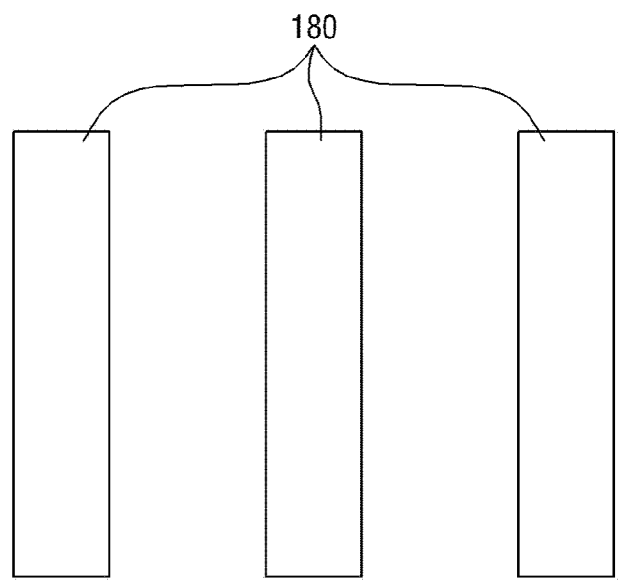
FIGS. 8 thru 10 are plan views of a pixel electrode of the display device shown in FIG. 1.
Figure 9:
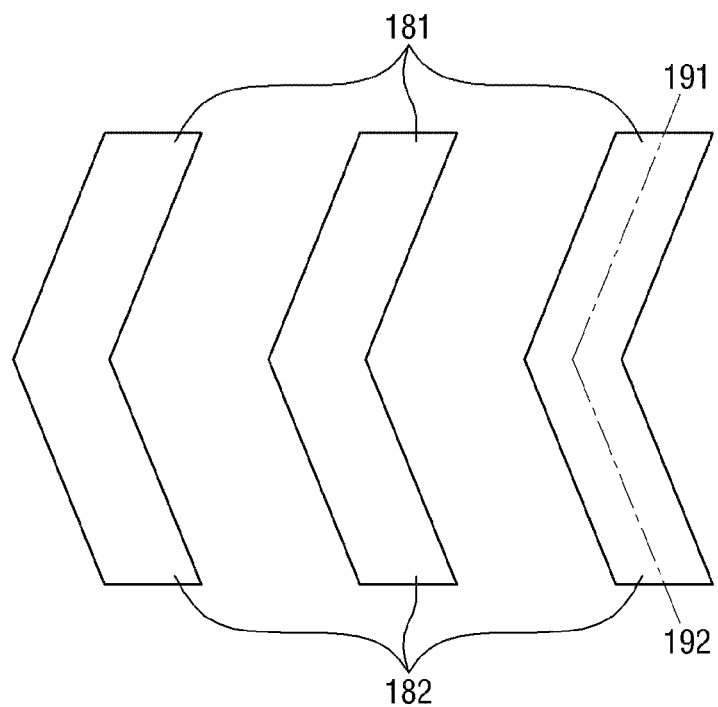
Figure 10:
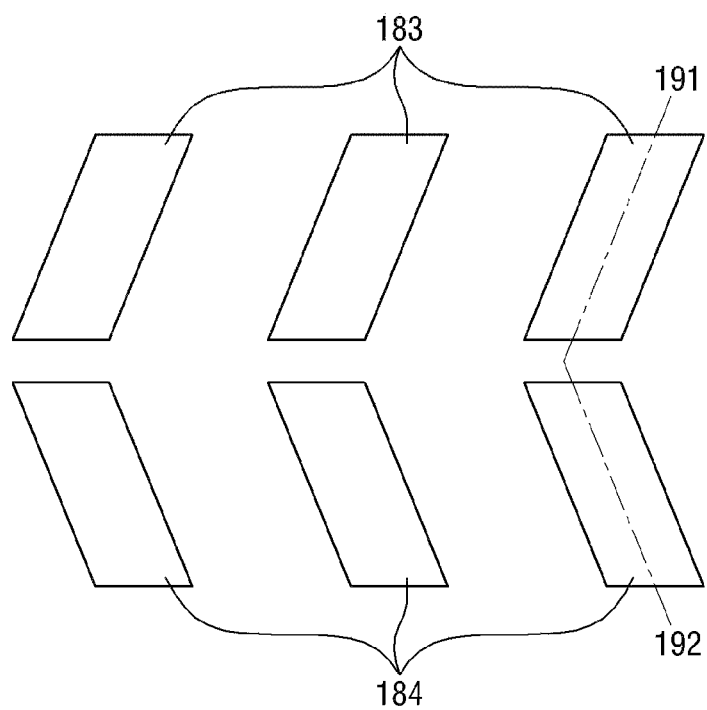

FIGS. 8 thru 10 are plan views of a pixel electrode of the display device shown in FIG. 1. In FIGS. 8 thru 10, an embodiment in which the first electrode 180 of FIG. 8 and the second electrode 150 of FIGS. 1 thru 5 are formed on different layers on the first substrate 160 of FIGS. 1 thru 5 is illustrated.

FIG. 8 is a plan view of a pixel electrode of the display device 100 according to the embodiment of FIG. 1. Referring to FIG. 8, the first electrode 180 (i.e., the pixel electrode) may be disposed on the second electrode 150 (i.e., the common electrode) of FIGS. 1 thru 5 and may be linear.

Referring to FIG. 9, the first electrode 180 may include a first electrode portion 181 disposed in a first direction and a second electrode portion 182 disposed in a second direction. The first direction and the second direction may be different. In some embodiments, the first electrode portion 181 may be symmetrical to the second electrode portion 182 with respect to a middle portion of the first electrode 180.

Referring to FIG. 10, the first electrode 180 may include a first electrode portion 183 disposed in the first direction and a second electrode portion 184 disposed in the second direction. The first electrode portion 183 may be separated from the second electrode portion 184.

When the first electrode 180 includes the first electrode portion 181 or 183 disposed in the first direction and the second electrode portion 182 or 184 disposed in the second direction as shown in FIG. 9 or 10, that is, when the first electrode 180 is bent at the middle portion thereof such that the first electrode portion 181 or 183 is symmetrical to the second electrode portion 182 or 184, a direction of a main fringe field in the first electrode portion 181 or 183 is different from that of the main fringe field in the second electrode portion 182 or 184. Accordingly, two domains are formed in one pixel region. In this case, liquid crystals located in the two different domains of one pixel region move differently. Eventually, the position of a long axis of the liquid crystals is different in the two domains, thus reducing a color shift at a certain azimuth.

That is, a region formed in the first electrode portion 181 or 183 of each pixel region may be defined as a first domain region, and a region formed in the second electrode portion 182 or 184 of each pixel region may be defined as a second domain region. In this case, an azimuth at which a color shift occurs in the first domain region is different from an azimuth at which a color shift occurs in the second domain region. Therefore, the first and second domain regions compensate for each other's color shift, resulting in a reduction in color shift.

Figure 11:
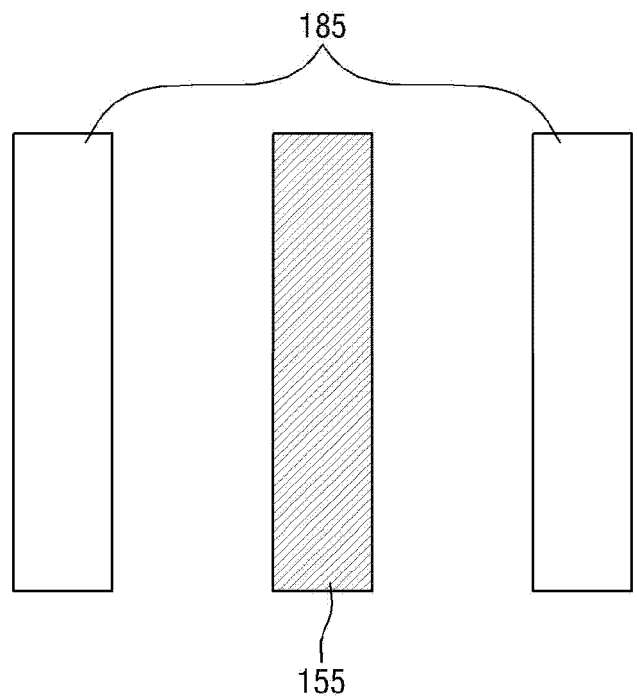
FIGS. 11 thru 13 are plan views of a pixel electrode and a common electrode of the display device according to the exemplary embodiment of FIG. 1.
Figure 12:
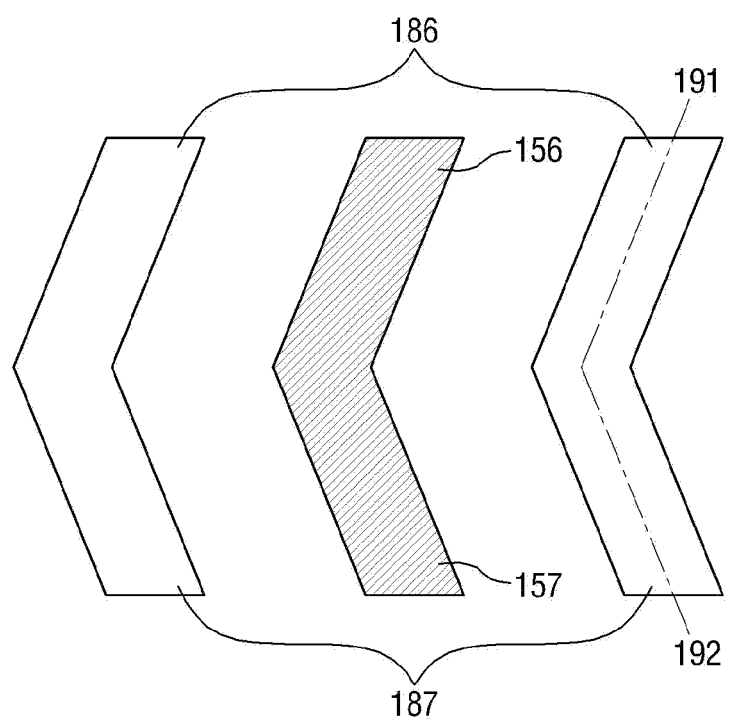
Figure 13:
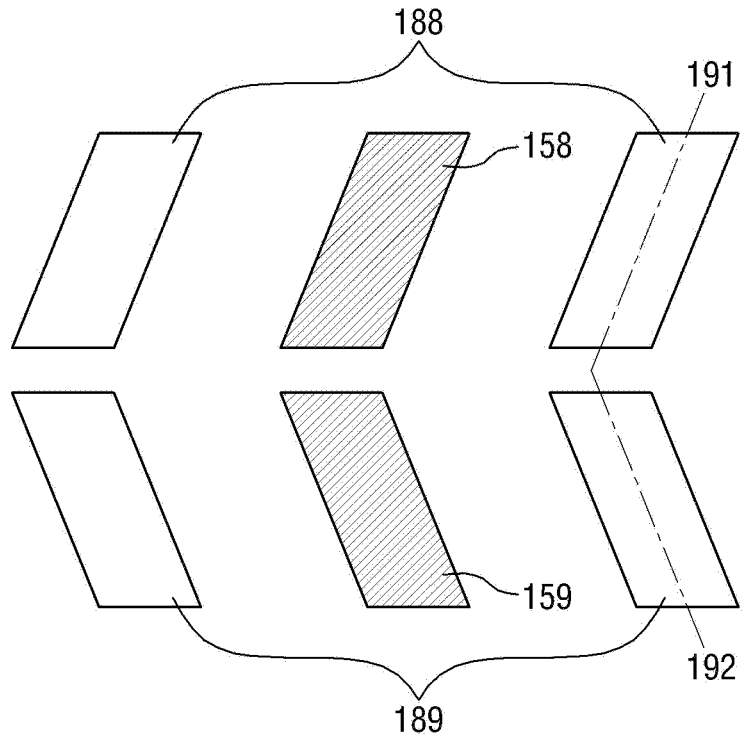

FIGS. 11 thru 13 are plan views of a pixel electrode and a common electrode of the display device according to the exemplary embodiment of FIG. 1. In FIGS. 11 thru 13, an embodiment in which a first electrode 185 (i.e., a pixel electrode) and a second electrode 155 (i.e., a common electrode) are formed on the same layer on the first substrate 160 of FIGS. 1 thru 5 is illustrated.

In FIG. 11, an embodiment in which the first electrode 185 and the second electrode 155 are formed on the same layer on the first substrate 160 of FIGS. 1 thru 5 is illustrated. Referring to FIG. 11, the first electrode 185 and the second electrode 155 may be arranged alternately on the first substrate 160 of FIGS. 1 thru 5, and may be linear.

Referring to FIG. 12, the first electrode 185 may include a first electrode portion 186 disposed in a first direction and a second electrode portion 187 disposed in a second direction. In addition, the second electrode 155 may include a third electrode portion 156 disposed in the first direction and a fourth electrode portion 157 disposed in the second direction. The first direction and the second direction may be different. In some embodiments, the first electrode portion 186 may be symmetrical to the second electrode portion 187 with respect to a middle portion of the first electrode 185, and the third electrode portion 156 may be symmetrical to the fourth electrode portion 157 with respect to a middle portion of the second electrode 155.

Referring to FIG. 13, the first electrode 185 may include a first electrode portion 188 disposed in the first direction and a second electrode portion 189 disposed in the second direction. The first electrode portion 188 may be separated from the second electrode portion 189. In addition, the second electrode 155 may include a third electrode portion 158 disposed in the first direction and a second electrode portion 159 disposed in the second direction. The third electrode portion 158 may be separated from the fourth electrode portion 159.

When the first electrode 185 includes the first electrode portion 186 or 188 disposed in the first direction and the second electrode portion 187 or 189 disposed in the second direction, and when the second electrode 155 includes the third electrode portion 156 or 158 disposed in the first direction and the fourth electrode portion 157 or 159 disposed in the second direction as shown in FIG. 12 or 13 (that is, when the first electrode 185 and the second electrode 155 are bent at the middle portions thereof such that the first electrode portion 186 or 188 is symmetrical to the second electrode portion 187 or 189 and the third electrode portion 156 or 158 is symmetrical to the fourth electrode portion 157 or 159), a direction of a main fringe field in the first electrode portion 186 or 188 is different from that of the main fringe field in the second electrode portion 187 or 189, and the direction of the main fringe field in the third electrode portion 156 or 158 is different from that of the main fringe field in the fourth electrode portion 157 or 159. Accordingly, two domains are formed in one pixel region. In this case, liquid crystals located in the two different domains of one pixel region move differently. Eventually, the position of a long axis of the liquid crystals is different in the two domains, thus reducing a color shift at a certain azimuth.

That is, a region formed in the first electrode portion 186 or 188 and the third electrode portion 156 or 158 of each pixel region may be defined as a first domain region, and a region formed in the second electrode portion 187 or 189 and the fourth electrode portion 157 or 159 may be defined as a second domain region. In this case, an azimuth at which a color shift occurs in the first domain region is different from an azimuth at which a color shift occurs in the second domain region. Therefore, the first and second domain regions compensate for each other's color shift, resulting in a reduction in color shift.

Figure 14:
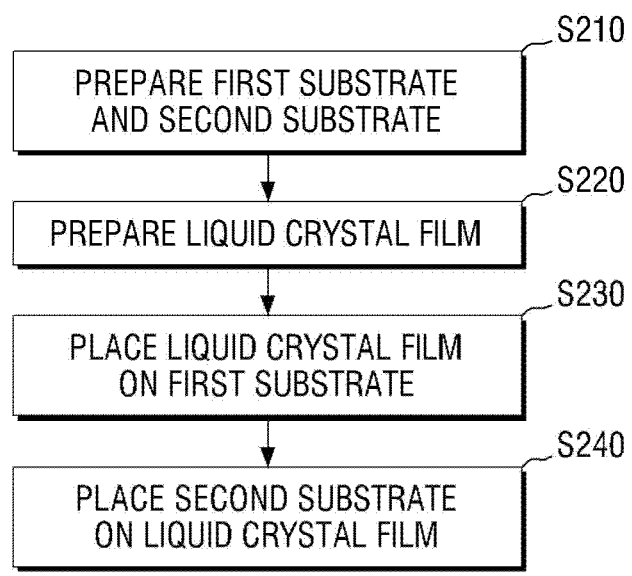
FIG. 14 is a flowchart illustrating a method of manufacturing a display device according to an exemplary embodiment of the present invention.
Figure 15:
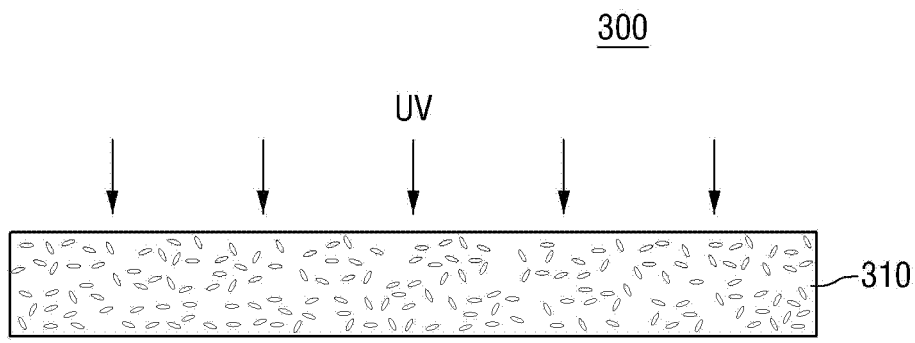
FIGS. 15 thru 17 are cross-sectional views showing, on a step-by-step basis, the method of manufacturing a display device according to the exemplary embodiment of FIG. 14.
Figure 16:
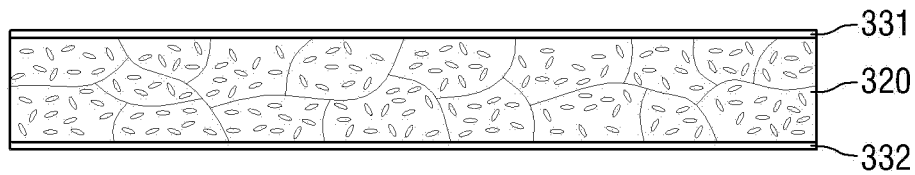
Figure 17:
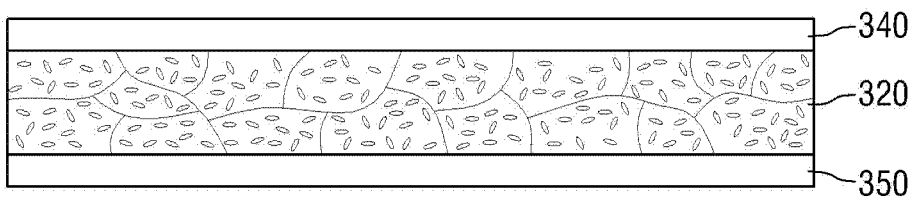

FIG. 14 is a flowchart illustrating a method of manufacturing a display device according to an exemplary embodiment of the present invention; and FIGS. 15 thru 17 are cross-sectional views showing, on a step-by-step basis, the method of manufacturing a display device according to the exemplary embodiment of FIG. 14.

In the method of manufacturing a display device according to the current exemplary embodiment, a first substrate 350 and a second substrate 340 are prepared (operation S210). The first substrate 350 and the second substrate 340 are substantially identical to the first substrate 160 and the second substrate 120, respectively, described above with reference to FIG. 1, and thus a redundant description thereof is omitted.

Next, a liquid crystal film is prepared (operation S220). FIGS. 15 and 16 are cross-sectional views of a display device, showing, on a step-by-step basis, the preparing of the liquid crystal film.

Referring to FIGS. 15 and 16, in order to prepare the liquid crystal film, a mixture 310 of liquid crystals and a monomer is prepared. Then, the mixture 310 is exposed to ultraviolet (UV) light, thereby forming a PSLC 320. The PSLC 320 may be a PNLC or a PDLC. In FIGS. 16 and 17, the PNLC is illustrated as the PSLC 320.

The size of domains of the PSLC 320 may be 200 nm or less. Preferably, the size of the domains of the PSLC 320 may be 80 nm or less. When the PSLC 320 is a PNLC, the size of domains of the PNLC is a distance between networks of the PNLC. When the PSLC 320 is a PDLC, the size of domains of the PDLC is a diameter of droplets of the PDLC in a long direction. The domains of the PSLC 320, the networks of the PNLC and the droplets of the PDLC are substantially identical to the domains of the PSLC, the networks of the PNLC and the droplets of the PDLC described above with reference to FIG. 1, and thus a redundant description thereof is omitted.

When the size of the domains of the PSLC 320 (that is, when the distance between the networks of the PNLC) is much smaller than wavelengths (approximately 380 to 770 nm) of visible light, a scattering effect in the PNLC disappears. In addition, when the distance between the networks of the PNLC is very small, the refraction of light in the PNLC is substantially very small. Therefore, an optically isotropic state can be realized in a visible light range.

Referring to FIG. 16, adhesive films 331 and 332 may be attached to the PSLC 320 formed by UV exposure. In some embodiments, the adhesive films 331 and 332 may be optically clear adhesive (OCA) films.

Next, the liquid crystal film is placed on the first substrate 350 (operation S230). Here, the liquid crystal film may be placed on the first substrate 350 using the adhesive film 332 attached to the liquid crystal film.

The second substrate 340 is placed on the liquid crystal film (operation S240). The second substrate 340 may be placed on the liquid crystal film using the adhesive film 331 attached to the liquid crystal film.

The placing of the liquid crystal film on the first substrate 350 and the placing of the second substrate 340 on the liquid crystal film may be accomplished by a roll-to-roll process.

While the formation of a pixel electrode and the formation of a common electrode are not illustrated in FIGS. 14 thru 17, the pixel electrode and the common electrode may also be formed in the method of manufacturing a display device as in the above-described embodiment of FIGS. 1 thru 13.

In the method of manufacturing a display device according to the current exemplary embodiment, a process of injecting or dropping liquid crystals is not used. Instead, a liquid crystal film including a PSLC is used. In this case, the PSLC brings about an anchoring effect in all directions, thus making the omission of an alignment process possible. Therefore, since an alignment film process, a rubbing process, a spacer process and a sealing process can be omitted, unlike in a conventional process of manufacturing a display device, the process of manufacturing a display device according to the current exemplary embodiment can be simplified. In addition, if UV exposure is performed after the injecting or dropping of the liquid crystals, elements on a substrate can be damaged. However, if a separately formed liquid crystal film is used as in the present invention, the damage to the elements on the substrate can be prevented.

Furthermore, using a liquid crystal film including a PSLC instead of using the process of injecting or dropping liquid crystals makes it possible to apply a roll-to-roll process. The roll-to-roll process applicable to the method of manufacturing a display device according to the current exemplary embodiment can simplify the process of manufacturing a display device, and can be used to manufacture a flexible display.

Figure 18:
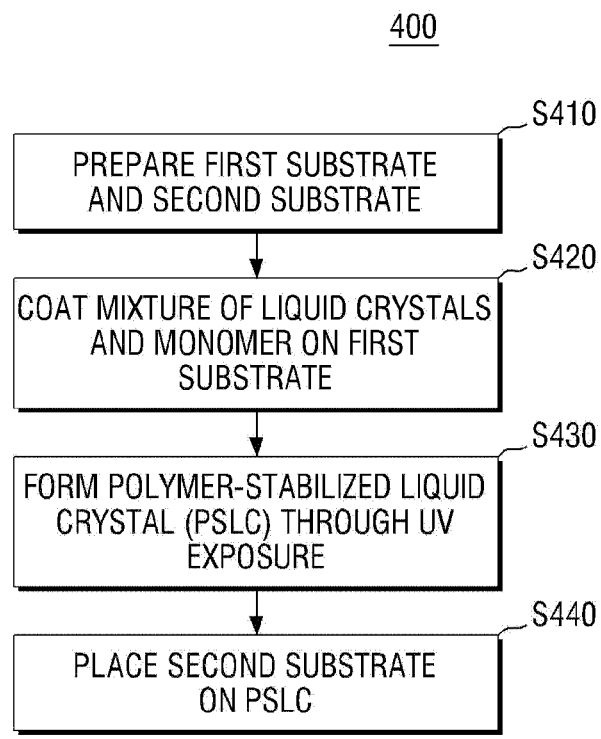
FIG. 18 is a flowchart illustrating a method of manufacturing a display device according to another exemplary embodiment of the present invention.
Figure 19:
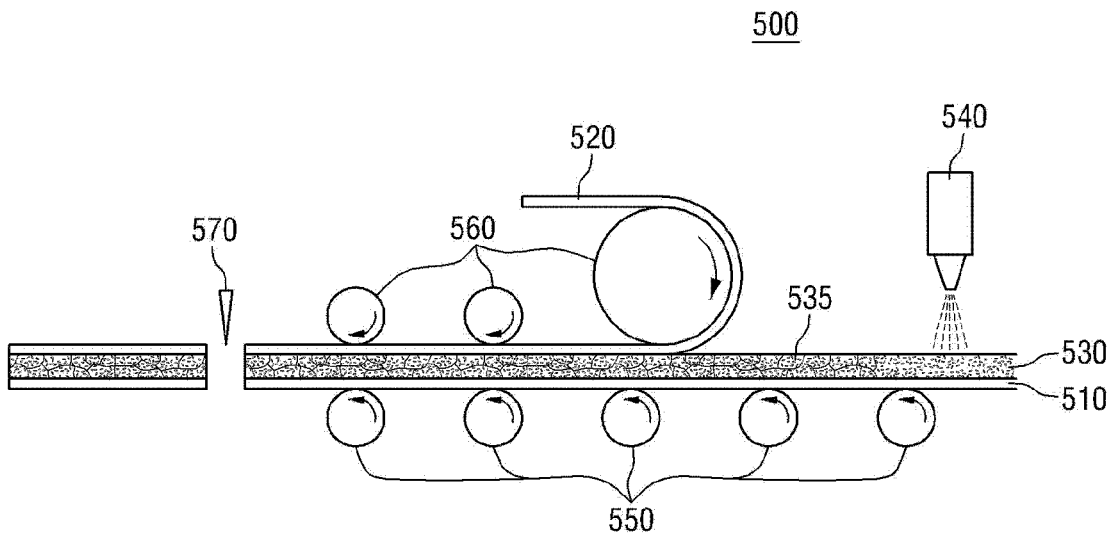
FIG. 19 is a conceptual diagram illustrating the method of manufacturing a display device according to the exemplary embodiment of FIG. 18.

FIG. 18 is a flowchart illustrating a method of manufacturing a display device according to another exemplary embodiment of the present invention; and FIG. 19 is a conceptual diagram illustrating the method of manufacturing a display device according to the exemplary embodiment of FIG. 18.

In the method of manufacturing a display device according to the current exemplary embodiment, a first substrate 510 and a second substrate 520 are prepared (operation S410). The first substrate 510 and the second substrate 520 are substantially identical to the first substrate 160 and the second substrate 120, respectively, described above with reference to FIG. 1, and thus a redundant description thereof is omitted.

Next, a mixture 530 of liquid crystals and a monomer is coated on the first substrate 510 (operation S420), and the mixture 530 of the liquid crystals and the monomer is exposed to UV light, thereby forming a PSLC 535 having a domain size of 200 nm or less (operation S430). Preferably, a PSLC having a domain size of 80 nm or less may be formed. The PSLC 535 may be a PNLC or a PDLC.

When the PSLC 535 is a PNLC, the size of domains of the PNLC is a distance between networks of the PNLC. When the PSLC 535 is a PDLC, the size of domains of the PDLC is a diameter of droplets of the PDLC in a long direction. The domains of the PSLC 535, the networks of the PNLC, and the droplets of the PDLC are substantially identical to the domains of the PSLC, the networks of the PNLC, and the droplets of the PDLC, respectively, described above with reference to FIG. 1, and thus a redundant description thereof is omitted.

To form the PSLC 535 having a domain size of 200 nm or less, an initial proportion of the monomer in the mixture 530 may be approximately 20 to 30% by weight, and UV exposure may be performed in an exposure energy range of approximately 1 to 5 J, at an exposure of approximately 10 mW or more, and for an exposure time of less than approximately 3 minutes. Preferably, the UV exposure may be performed in an exposure energy range of approximately 5 J, at an exposure of approximately 50 mW, and for an exposure time of approximately 100 seconds. The initial proportion of the monomer, the exposure temperature, and the exposure time for forming the PSLC 535 are not limited to the above-described embodiment. Various combinations of the initial proportion of the monomer, the exposure energy range, the amount of exposure to UV light, and the exposure time can be made so as to achieve a domain size of 200 nm or less or a domain size of 80 nm or less.

Next, the second substrate 520 is placed on the PSLC 535 (operation S440).

The forming of the PSLC 535 and the placing of the second substrate 520 on the PSLC 535 may be accomplished by a roll-to-roll process.

The placing of the liquid crystal film on the first substrate 510 and the placing of the second substrate 520 on the liquid crystal film may be accomplished by a roll-to-roll process. The roll-to-roll process will now be described with reference to FIG. 19.

First, the first substrate 510 and the second substrate 520 may be prepared, and the first substrate 510 may be placed on lower rollers 550. The mixture 530 of the liquid crystals and the monomer may be coated on the first substrate 510 placed on the lower rollers 550. The first substrate 510 coated with the mixture 530 may be moved to the left of FIG. 19 by the lower rollers 550.

Then, the mixture 530 coated on the moving first substrate 510 may be exposed to UV light from a UV light source 540. After the UV exposure, the PSLC 535 into which the mixture 530 hardened exists on the first substrate 510 moving to the left side.

The first substrate 510 having the PSLC 535 may be continuously moved to the left of FIG. 19, and the second substrate 520 may be placed on the PSLC 535. To place the second substrate 520 on the PSLC 535, an upper roller 560 may be used.

After the second substrate 520 is placed on the PSLC 535, the display device may be continuously moved to the left of FIG. 19 by the upper roller 560 and the lower rollers 550. The liquid crystal display device being moved to the left may be cut on a panel-by-panel basis by a cutter 570.

While the formation of a pixel electrode and the formation of a common electrode are not illustrated in FIGS. 18 and 19, the pixel electrode and the common electrode may also be formed in the method of manufacturing a display device as in the above-described embodiment of FIGS. 1 thru 13.

In the method of manufacturing a display device according to the current exemplary embodiment, a process of injecting or dropping liquid crystals is not used. Instead, a roll-to-roll process is used. That is, using a roll-to-roll process, a mixture of liquid crystals and a monomer is coated on a first substrate and exposed to UV light, thereby forming a PSLC. In this case, the PSLC brings about an anchoring effect in all directions, thus making the omission of an alignment process possible. Therefore, since an alignment film process, a rubbing process, a spacer process and a sealing process can be omitted unlike in a conventional process of manufacturing a display device, the process of manufacturing a display device according to the current exemplary embodiment can be simplified.

In addition, the roll-to-roll process can be used instead of the process of injecting or dropping liquid crystals. The roll-to-roll process applicable to the method of manufacturing a display device according to the current exemplary embodiment can simplify the process of manufacturing a display device, and can be used to manufacture a flexible display.

Exemplary embodiments of the present invention provide at least one of the following advantages.

A superior front contrast ratio and a wide viewing angle can be achieved by realizing an optically isotropic state in a PSLC.

The problem of pooling or bruising caused by external pressure can be solved by limiting the flow of liquid crystals in the PSLC.

Unlike in a conventional process of manufacturing a display device, an alignment film process, a rubbing process, a spacer process and a sealing process can be omitted. In addition, instead of injecting or dropping liquid crystals, a film is printed or a solution is coated, and then a UV curing method is used. Therefore, the present invention is advantageous in terms of process.

Furthermore, a roll-to-roll process is applicable to the present invention. The roll-to-roll process enables process simplification, and can be used to manufacture a flexible display.

However, the effects of the present invention are not restricted to the one set forth herein. The above and other effects of the present invention will become more apparent to one of ordinary skill in the art to which the present invention pertains by referencing the claims.

What is claimed is:

1. A display device, comprising:
a first substrate having a first electrode and a second electrode;
an insulating layer disposed on the second electrode, the first electrode being disposed on the insulating layer;
a second substrate formed on the first substrate and facing the first substrate; and
a liquid crystal layer interposed between the first substrate and the second substrate,
the liquid crystal layer comprising a polymer-stabilized liquid crystal (PSLC), a size of domains of the PSLC being not greater than 200 nm.

2. The display device of claim 1, the PSLC being a polymer-networked liquid crystal (PNLC), a size of domains of the PNLC being a distance between networks of the PNLC.

3. The display device of claim 1, the PSLC being a polymer-dispersed liquid crystal (PDLC), a size of domains of the PDLC being a diameter of droplets of the PDLC in a long direction.

4. The display device of claim 1, the size of the domains of the PSLC being not greater than 80 nm.

5. The display device of claim 1, the first electrode being a pixel electrode, the second electrode being a common electrode, the first electrode and the second electrode being formed on different layers on the first substrate.

6. The display device of claim 5, the first electrode comprising a first electrode portion disposed in a first direction and a second electrode portion disposed in a second direction.

7. The display device of claim 6, the first direction and the second direction being different from each other.

8. The display device of claim 6, the first electrode portion and the second electrode portion being separated from each other.

9. A display device, comprising:
a first substrate having a first electrode and a second electrode;
a second substrate formed on the first substrate and facing the first substrate; and
a liquid crystal layer interposed between the first substrate and the second substrate,
the liquid crystal layer comprising a polymer-stabilized liquid crystal (PSLC), a size of domains of the PSLC being not greater than 200 nm, the first electrode being a pixel electrode, the second electrode being a common electrode, the first electrode and the second electrode being formed alternately on a same layer on the first substrate.

10. The display device of claim 9, the first electrode comprising a first electrode portion disposed in a first direction and a second electrode portion disposed in a second direction, the second electrode comprising a third electrode portion disposed in the first direction and a fourth electrode portion disposed in the second direction.

11. The display device of claim 10, the first direction and the second direction being different from each other.

12. The display device of claim 10, the first electrode portion and the second electrode portion being separated from each other, the third electrode portion and the fourth electrode portion being separated from each other.

13. A method of manufacturing a display device, the method comprising the steps of:
preparing a first substrate and a second substrate;
preparing a liquid crystal film comprising a polymer-stabilized liquid crystal (PSLC);
placing the liquid crystal film on the first substrate; and
placing the second substrate on the liquid crystal film.

14. The method of claim 13, the step of preparing the liquid crystal film comprising:
preparing a mixture of liquid crystals and a monomer;
forming the PSLC by exposing the mixture to ultraviolet light; and
attaching adhesive films to the PSLC.

15. The method of claim 14, the step of placing the liquid crystal film on the first substrate comprising placing the liquid crystal film on the first substrate using one of the adhesive films, the step of placing the second substrate on the liquid crystal film comprising placing the second substrate on the liquid crystal film using another one of the adhesive films.

16. The method of claim 13, the step of preparing the liquid crystal film comprising forming the PSLC so as to have a domain size not greater than 200 nm.

17. The method of claim 16, the step of preparing the liquid crystal film comprising forming a PNLC, a size of domains of the PNLC being a distance between networks of the PNLC.

18. The method of claim 14, the step of preparing the liquid crystal film comprising forming a PDLC, a size of domains of the PDLC being a diameter of droplets of the PDLC in a long direction.

19. The method of claim 13, the step of preparing the liquid crystal film comprising forming the PSLC so as to have a domain size of 80 nm.

20. The method of claim 13, the step of placing the liquid crystal film on the first substrate and the step of placing the second substrate on the liquid crystal film being performed by a roll-to-roll process.

21. A method of manufacturing a display device, the method comprising the steps of:
preparing a first substrate and a second substrate;
coating a mixture of liquid crystals and a monomer on the first substrate;
forming a polymer-stabilized liquid crystal (PSLC) having a domain size not greater than 200 nm by exposing the mixture to ultraviolet light; and
placing the second substrate on the PSLC.

22. The method of claim 21, the step of forming the PSLC comprising forming a PNLC, a size of domains of the PNLC being a distance between networks of the PNLC.

23. The method of claim 21, the step of forming the PSLC comprising forming a PDLC, a size of domains of the PDLC being a diameter of droplets of the PDLC in a long direction.

24. The method of claim 21, a weight percent of the monomer in the mixture being in a range of 20 to 30%, the exposing of the mixture to the ultraviolet light being performed in an exposure energy range of 1 to 5 J, at an exposure of not less than 10 mW, and for an exposure time of less than 3 minutes.

25. The method of claim 21, the step of forming the PSLC comprising forming the PSLC so as to have a domain size of 80 nm.

26. The method of claim 21, the step of forming the PSLC and the step of placing the second substrate on the PSLC being performed by a roll-to-roll process.

* * * * *